United States Patent
Calvaer

[11] 3,912,193
[45] Oct. 14, 1975

[54] WEB POSITION DETECTOR APPARATUS
[75] Inventor: Albert J. Calvaer, Waterloo, Belgium
[73] Assignee: Knox, Inc., South Walpole, Mass.
[22] Filed: June 21, 1973
[21] Appl. No.: 372,307

[52] U.S. Cl. ............... 242/57.1; 226/20; 250/548; 356/199
[51] Int. Cl.² ............... B65H 25/26; G01N 21/30
[58] Field of Search .................................. 242/57.1; 226/15–23; 250/548, 561, 571; 356/159, 160, 199, 200, 172

[56] References Cited
UNITED STATES PATENTS

| | | | |
|---|---|---|---|
| 2,147,617 | 2/1939 | McCleery | 250/261 |
| 2,641,416 | 6/1953 | McCleary et al. | 242/57.1 |
| 3,486,828 | 12/1969 | Nickell et al. | 356/199 |
| 3,568,904 | 3/1971 | Kurz | 242/57.1 |
| 3,570,735 | 3/1971 | Kurz | 242/57.1 |
| 3,612,702 | 10/1971 | Troll | 356/200 |
| 3,657,727 | 4/1972 | Blevins | 250/550 |
| 3,809,907 | 5/1974 | Schuller | 250/548 |

Primary Examiner—John W. Huckert
Assistant Examiner—John M. Jillions
Attorney, Agent, or Firm—Edgar H. Kent

[57] ABSTRACT

Web position detecting apparatus utilizes a laser beam emitter mounted to direct the beam at a web edge and a receiver mounted to receive the unblocked portion of the beam and arranged to control web position adjusting equipment according to the amount of the beam received. The apparatus is capable of accurate detection despite long distances of beam travel so that the apparatus can be located entirely beyond the limits of maximum and minimum plane changes of the web and is unaffected thereby or by changes in the ambient light.

8 Claims, 4 Drawing Figures

WEB POSITION DETECTOR APPARATUS

BACKGROUND OF THE INVENTION

1. Field of the Invention

This invention relates to web position detector apparatus for controlling the operation of a device for regulating registry of a moving web with equipment operating thereon, such as winding and unwinding equipment, feed, take-up and guide rolls, and the like.

2. Description of the Prior Art

Detector apparatus of the type concerned normally includes a sensor for sensing departures of the web from a desired position, usually by sensing the position of its edge or edges, and for causing appropriate correctional action by adjustment equipment. Sensors for such apparatus heretofore employed have usually been located in close proximity to the web edge sensed. Mechanical sensors are in actual contact with the web edge, while sensors employing a beam of light (photocells) or of air (jets) have their emitters and receivers close together and hence close to opposite faces of the web at its edge to avoid excessive divergence of the beam. This proximity to the web creates problems. Major fluctuations in the web path can bring the web into damaging engagement with the sensing equipment. Certain desirable uses of such equipment are seriously impaired.

An example of such impaired use is for edge guiding to control registry of a web with winding or unwinding equipment. For this purpose, web edge position detection should be made close to the winding or unwinding roll. But the plane of the web changes drastically as the radius of the wound roll thereof increases or decreases. For example, the radius of a wound roll of metal strip may increase by 6 feet or more from initial to last winding and decrease correspondingly on unwinding. Close to the roll, the plane of the web is moved away from initial position nearly as much, and in addition, its angularity is drastically changed. Such changes in web plane would so alter the intercepted proportion of a diverging light beam, between an emitter and receiver at opposite sides of the maximum and minimum plane changes of the web, as to make such an arrangement impracticable.

To provide automatic position adjustment for detection equipment close to the web to correspond with such changes in plane and angularity of the web would be prohibitively complex and expensive. Accordingly, the detection has had to be made at a distance from the winding or unwinding equipment beyond the point where these changes in web plane and angularity begin to occur, e.g., before the last idler roller for winding and beyond the first idler roller for unwinding. Thus, web position shifts occurring close to a winding roll go undetected and the accuracy of the controlled adjustment equipment is seriously impaired. Such position shifts in an unwinding web are not detected soon enough. Elaborate mechanism is required to enable the detecting equipment to shift position in correspondence with the equipment it shifts which is necessary in winding roll control.

SUMMARY OF THE INVENTION

An object of this invention is to provide web edge position detectors which do not have the proximity-to-web limitation of prior such detectors, and which avoid the problems inherent in such limitation. Another object is to provide such detectors which are highly accurate and are neither relatively complex nor relatively costly as compared with prior such devices.

In attaining the foregoing objects, the present invention utilizes as the sensor for the detector a laser beam emitter and a photoelectric cell receiver, both of which are located at a distance remote from the web path, so that they are out of the way of even drastic changes in the plane and angularity of the web path. The emitter is of a type which emits a beam that does not penetrate materials opaque to ordinary light (e.g. helium neon type). In preferred embodiments, the emitter and receiver are packaged together for mounting opposite one face of the web and the beam is reflected into the receiver by a mirror located beyond the opposite face of the web. This arrangement avoids mutual position adjustment difficulties and possible inaccuracies involved when the emitter and receiver are independently mounted beyond opposite faces of the web, or the use of elongated framework connecting such mountings for mutual adjustment. However, the emitter and receiver may be mounted at opposite sides of the web, with or without such connecting framework.

It has been found that the divergence of such laser beams is so slight and their power is so great that distances of beam travel of the order of 30 feet or more are practicable. This means, for example, that an emitter-receiver unit may be mounted far above the web path and above all potential web plane changes, such as at ceiling level or on ceiling beams in many cases, with the reflector mirror mounted on the floor. By reason of the lack of divergence of the beam, the accuracy of detection is unaffected by changes in web plane. When a mirror is used it is usually made long enough to underlie the complete zone of possible lateral position changes of the web edge, so that lateral position adjustment of the mirror with respect to the web edge is not required. The mirror is however normally adjustable about an axis to change the angle of its reflectance of the beam as may be desired according to the positioning of the emitter-receiver relative thereto.

It has also been found that the intensity of the laser beam is such that, even at the distances mentioned, a photocell detector can be used which is unaffected by changes in the ambient light and yet will detect all requisite changes in the amount of the beam which it receives. Hence shielding of the photocell from ambient light becomes unnecessary.

A particularly advantageous use of detectors of the invention is to control the adjustment of web winding or unwinding equipment longitudinally of the axis of the winding arbor to maintain a winding roll substantially centered on the web delivered to it, or to maintain a substantially constant delivery position of an unwinding roll centered on following equipment. For web winding control the emitter and receiver of the detector are moved in unison with the adjustment movements of the equipment and to that end are mounted on the movable equipment, preferably as a packaged unit mounted above an edge of the web path at maximum diameter of the wound web and close to the roll. An elongated mirror mounted at the opposite side of the web, on the floor for example, extends under and beyond the edge of the web and is adjusted to reflect the laser beam at an angle, determined according to the spacing of the emitter and receiver and their distance from and angular relation to the mirror, such that the reflected beam, or unblocked part thereof, is reflected into the receiver. For web unwinding control, the arrangement may be the same except that the emitter and receiver are fixedly mounted and do not move with adjustments of the unwinding equipment.

The emitter-receiver unit is initially position-adjusted so that approximately half the emitted beam is intercepted by the web as positioned for start of the wind or unwind, the other half of the beam passing the web edge to be reflected by the mirror into the photocell receiver. Increases and decreases of the amount of the beam received by the photocell, corresponding to lateral shifts of the web edge from initial position, cause increases and decreases in the electrical resistance of the photocell, which are used to control the direction and amount of adjustment movement of the controlled equipment. Changes in the plane and angularity of the web as the winding or unwinding proceeds and changes in the ambient light do not affect the operation of the detector.

DESCRIPTION OF THE PREFERRED EMBODIMENTS

Figure 1:
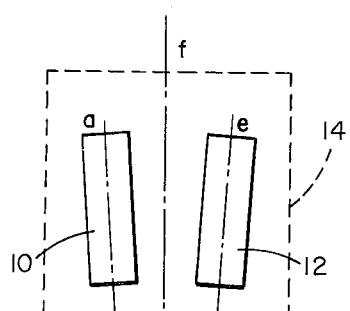
FIG. 1 is a diagrammatic side elevation view of detector apparatus according to the invention applied to detecting the position of an edge of a web.

Referring first to FIG. 1, a laser beam emitter 10 and a photoelectric cell receiver thereof 12 are mounted together in a housing 14 located above the path of travel of a web W which is being wound by, or unwound from, a roll on winding or unwinding mechanism (not shown) at the left of the Figure. The mounting for the housing 14 (not shown) is, if the web W is being wound and therefore moving to the left in FIG. 1, on or connected to the movable winding mechanism which is adjustably shiftable transversely of the web. If the web is being unwound, and therefore moving to the right in FIG. 1, housing 14 is mounted on or from fixed structure such as a ceiling beam above the web path. As indicated by the dash lines, the plane and angularity of the web increase or decrease as the radius of the roll being wound or unwound increases or decreases, with respect to the horizontal and a fixed roll or rolls (not shown) to the right in FIG. 1 which precede a winder or follow an unwinder.

Mounted beneath the web is a mirror M which in part underlies the web W and in part extends beyond an edge E of the web, with its long axis transverse to the web path. Mirror M is at right angles to the centerline $f$-$c$ between the laser emitter 10 and the receiver 12 which are inclined toward each other from top to bottom at equal angles to line $f$-$c$ such that the centerline of the laser beam from emitter 10 to the mirror $a$-$b$-$c$ is reflected back as beam $c$-$d$-$e$ centered on receiver 12. The angles $a$-$c$-$f$ and $f$-$c$-$e$ are determined according to the distance of the emitter and receiver from the mirror M and may be exactly computed. While in FIG. 1 line $c$-$f$ is shown as vertical it need not be and may be at an angle in either direction up to 45° to vertical so long as the mirror is adjusted so that its planar reflecting surface is at a right angle to line $f$-$c$. Mirror M is preferably adjustable about its longitudinal axis X to permit such variation which may be desirable to facilitate mounting. At centered position, centerlines $a$-$b$-$c$ and $c$-$d$-$e$ of the laser beam are aligned with edge E of web W.

Figure 2:
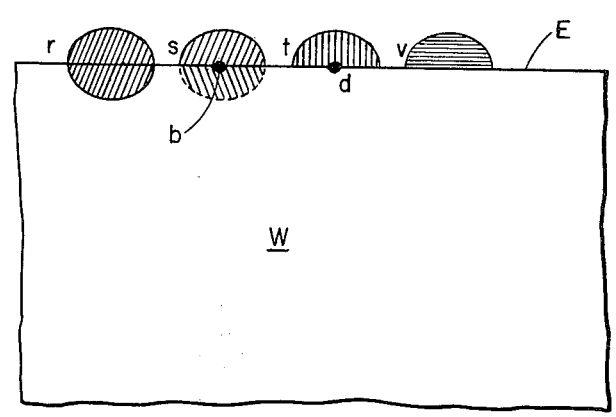
FIG. 2 is a diagrammatic top plan view of a portion of the web of FIG. 1, illustrating in enlarged diagrammatic cross sections the laser beam at four different points of travel.

FIG. 2 illustrates four cross-sections of the laser beam with reference to edge E of the web. Section $r$ is taken at the emitter 10, the beam being complete. Section $s$ is taken at the intersection of the laser beam centerline $b$ with edge E wherein, as indicated by different cross-hatching, the beam half within the web edge E is intercepted by the web and becomes inoperative, the remainder of the beam passing the web edge to be reflected by mirror M past it as indicated by Section $t$ into receiver 12 where Section $v$ is taken. It will be appreciated that as the web edge E shifts laterally toward the emitter, the intercepted beam part is increased and the reflected portion decreased, while the converse is true for web edge shift in the opposite direction. The beam sections are shown enlarged, as the beam will ordinarily be of the order of one-eighth inch in diameter.

Emitter 10 may be a commercially available helium-neon laser such as are available from Metrologic Instruments, Inc., producing, for example, a stable bright red beam with a wavelength of 633 nanometers. Receiver 12 may also be a commercially available photoelectric cell sensor type, for example, of the type in which the quantum of light received increases the resistance of one leg of an electrically connected Wheatstone bridge circuit, connected so that resistance increase above a maximum value provides current flow of one sign at proportionately increasing voltage with increased resistance, while decrease below a minimum produces current flow of the opposite sign, at proportionately increasing voltage with decreased resistance. The electric currents at opposite polarities are amplified and used to control proportionately the opposite adjustment movements of the controlled equipment. In the example given above of a laser beam with a wavelength of 633 nanometers, the receiver should have a peak response in the neighborhood of that wavelength, and will be substantially unaffected by ambient light though fully effective to indicate changes in the amount of the beam it receives.

Figure 3:
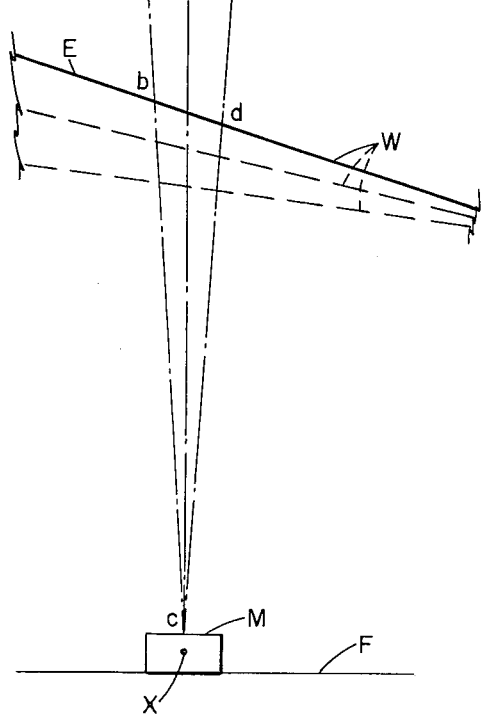
FIG. 3 is a longitudinal section view of a portion of the detector apparatus shown diagrammatically in FIG. 1.
Figure 3:
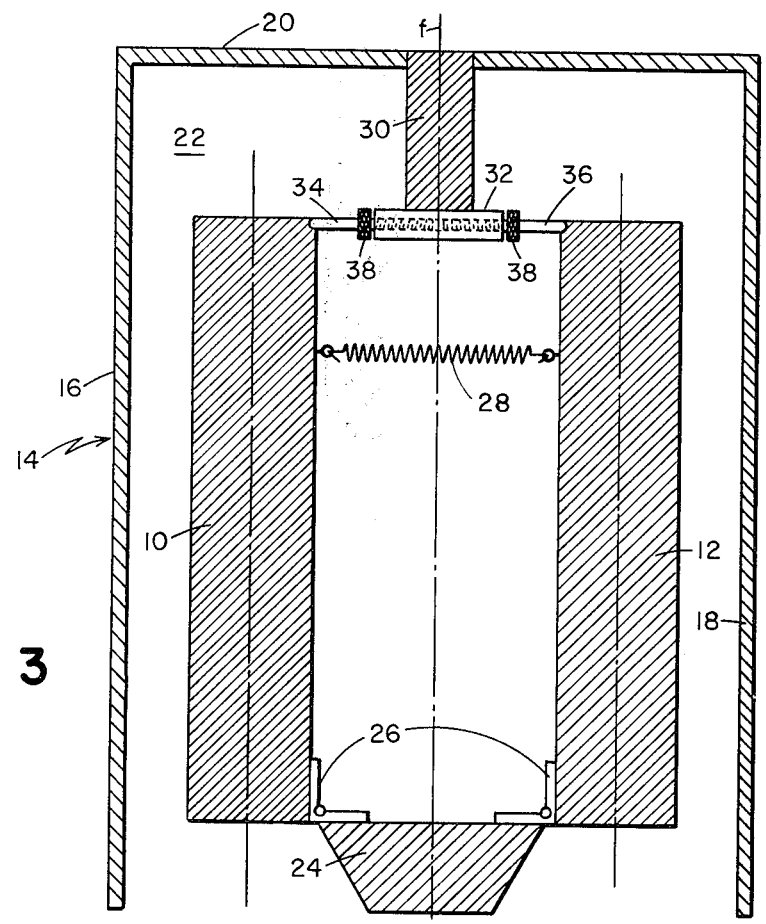

FIG. 3 illustrates a suitable adjustable form of the laser emitter-receiver assembly shown diagrammatically in FIG. 1. In FIG. 3, housing 14 is a generally rectangular box structure having side walls 16, 18, top wall 20, and end walls one of which is shown at 22. The housing is open at the bottom save for a central rib 24 extending between the end walls. Emitter 10 and receiver 12 are mounted at their emitting and receiving ends respectively to the sides of rib 24 by hinges 26 so that these ends can pivot toward each other and their opposite ends away from each other from the inoperative parallel position shown to an operative position such as shown in FIG. 1 at equal angles to the centerline between them $f$-$c$. A coil spring 28 connected between emitter 10 and receiver 12 near their opposite ends urges them together toward the position of FIG.

3. A rod 30 connected to top wall 20 has at its end a member 32 transversely bored, the bore being oppositely screw threaded from its center to its ends to receive the threaded shanks of adjustment pins 34, 36. Pins 34, 36 bear at their outer ends against sockets in emitter 10 and receiver 12 respectively and are provided with knurled wheels 38 by which they may be turned in one direction or the other to move the associated end of the emitter or receiver outwardly against the action of spring 28, or inwardly, to effect the desired adjustment.

Figure 4:
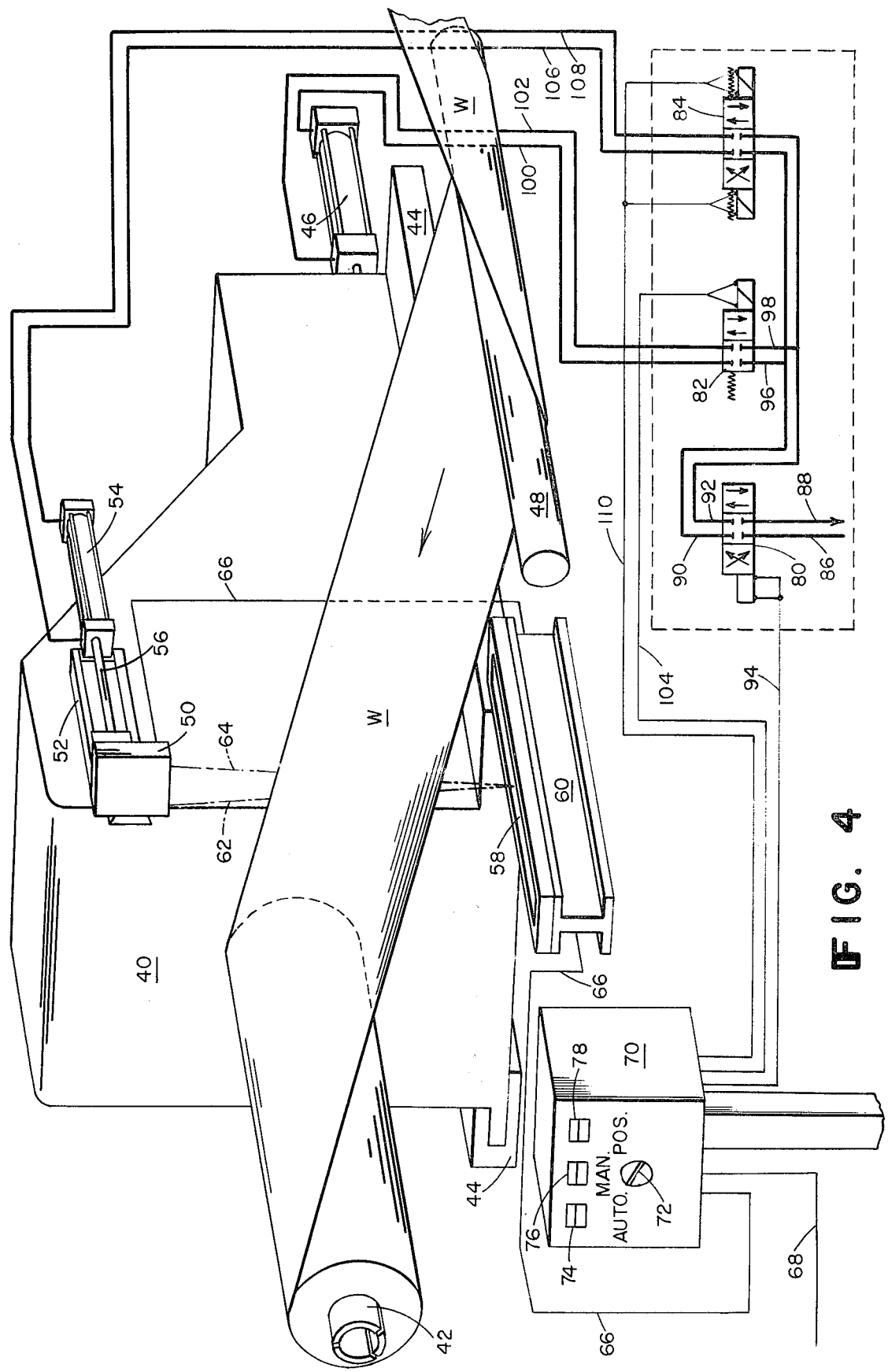
FIG. 4 is a schematic layout view of a web winding machine provided with detector apparatus according to the invention with electro-hydraulic operating circuitry shown largely in diagram.

FIG. 4 shows web-winding equipment to which detector apparatus of the invention has been applied to control adjustment movements of the winding machine. The winding machine 40 is mounted for slidable adjustment longitudinally of the axis of its winding arbor 42 in base slideways 44. Slidable adjustment of the machine is effected by hydraulic cylinder 46. Arbor 42 winds the web thereon as it is received from preceding idler roller 48 mounted on a fixed axis. A detector head 50 is mounted on machine 40 and is slidable longitudinally of the axis of arbor 42, in a slideway 52 fixed to machine 40, by means of hydraulic cylinder 54 the piston of which is connected thereto by rod 56.

The detector head may be the same as shown in FIGS. 1 and 3, and in the operative position shown, is located so that its emitter and receiver are normally centered over the adjacent edge E of the web. A mirror 58 mounted on a stand 60 on the floor has its longitudinal axis transverse to the longitudinal axis of the web and extends under and beyond edge E sufficiently so that edge E always overlies the mirror despite wandering. The mirror is in a plane at a right angle to the centerline between the emitter and receiver of detector head 50, which are angled so that laser beam 62 from the emitter is reflected back, in such part as is not intercepted by the web, into the receiver as reflected beam 64. A four wire cable 66 provides electric input to the emitter and to the bridge circuit of the receiver of detector head 50 from a source line 68 through control cabinet 70, and transmits the output from the bridge circuit to an amplifier (not shown) in control cabinet 70.

Cabinet 70 has a three position switch control 72 and an ON-OFF switch 74 for the control system. As more fully explained hereinafter, the "AUTO." (automatic) position of control 72 connects the amplified output from the receiver of head 50 to control valves which effect the opposite adjustment actuations of hydraulic cylinder 46 to adjust machine 40; the "MAN." (manual) position of control 72 connects these control valves for manual operation by two respectively "IN" and "OUT" pushbutton switches 76; while at "POS." (position), control 72 connects operating control valves to effect the opposite actuations of hydraulic cylinder 54 to move detector head 50 in and out of operative position when the two IN and OUT pushbutton switches 78 are respectively operated.

In the particular control circuitry indicated in FIG. 4, three valves are provided for controlling the fluid flow to and from the hydraulic cylinders, these being designated respectively 80, 82 and 84. Valve 80 is a three position, 4-way proportional servo valve which is movable in opposite directions from the off or nul position shown to connect a pressure line 86 from a high pressure manifold of hydraulic fluid (not shown) and a return line 88 to a reservoir (not shown), selectively oppositely to flow lines 90, 92. Valve 80 is of a type which is moved oppositely from its nul to its two proportional operating positions according to the direction of electric currents of opposite polarity supplied via two line cable 94 from cabinet 70 to the torque motor of the valve.

Valve 82 is a two position 2-way valve which connects lines 90, 92 from valve 80 via lines 96, 98 with lines 100, 102 which are connected to ports on opposite ends of machine-adjusting cylinder 46. Valve 82 functions as a lockout valve which insures against unwanted operation of cylinder 46 due to a failure of valve 80 to seat accurately in nul position, and prevents machine adjustment during positioning of the detector head 50. The solenoid of valve 82 is operated against a spring by electric current over a two line cable 104 from cabinet 70 which is connected to a source of operating current at AUTO. position and by IN-OUT switches 76 at MAN. position of control 72, but not at POS.

In AUTO. position of control 72 the lines of cable 94 are connected to the amplifier so that when laser beam 62 is less than half blocked by the web the polarity of the output from the amplifier is such as to move valve 80 to the left, connecting pressure line 86 to line 90 and, via valve 82, line 100 and connecting return line 88 to lines 92 and 102, so that cylinder 46 moves machine 40 in, that is, to the left in the drawing. When the beam 62 is more than half blocked by the web, reverse actuations of valve 80 and cylinder 46 take place. In MAN. position of control 72, operating cable 94 to valve 80 is disconnected from the amplifier of the sensing equipment and connected to an independent source of DC current which is oppositely applied to the two wires of cable 94 by the IN and OUT manual control switches 76.

Valve 84 is a three position, 4-way valve the purpose of which is to selectively oppositely connect lines 90, 92 from servo valve 80 to lines 106, 108 going to the ports on opposite ends of hydraulic cylinder 54. Valve 84 is oppositely actuated to its two operating positions from its nul position shown, by two end solenoids operated by electric current over a three line cable 110 providing two operating circuits for the two solenoids, these circuits being respectively operated by the IN and OUT manual control switches 78 when control 72 is at POS. Valve 84 and cylinder 54 are actuated only to move head 50 out of harm's way to the right in slide 52 in FIG. 4 while a wound web is being removed and to return it to operative position in line with the edge E of a new web applied for winding to arbor 42.

In order to facilitate accurate repositioning of head 50 with respect to the new web edge E, control 72 at POS. connects operating cable 94 of servo valve 80 to the amplified output from the sensing head 50, while line 104 to lockout valve 82 is disconnected. Since web W has been cut and removed from under head 50, the output from its photocell operates valve 80 to its position connecting lines 86, 88, 90 and 92 which would call out movement of machine 40 in toward the web axis if valve 82 were not shut off. Thus hydraulic pressure is present in line 90, and valve 84 is operated by the OUT switch 78 to connect this pressure line to line 108 going to the port at the lefthand end of cylinder 54 and the other line 92 to line 106 going to the port at the opposite end of cylinder 54, so that head 50 is moved out, or to the right in FIG. 4, to retracted position.

In retracted position, head 50 still overlies mirror 58 so that valve 80 remains in the same operative position. When the new web end is in place on arbor 42, the IN switch 78 is pushed to energize and reverse valve 84 and the connections of lines 106, 108 to lines 90, 92 so that cylinder 54 moves head 50 in toward the new web edge. When head 50 reaches a position in which laser beam 62 begins to be intercepted by the web, the control current to valve 80 reduces and stops when beam 62 is centered over edge E, so that valve 80 returns to nul position and further operation of cylinder 54 is prevented.

It should be appreciated that the apparatus and operating connections of FIG. 4 could be the same if the machine 40 were an unwinder instead of a winder, the only necessary change being that slide 52 is mounted on fixed structure rather than on the adjustably moving machine. It should also be understood that while edge position detecting apparatus according to the invention is particularly useful for detection close to winding or unwinding equipment because of its insensitivity to changes in plane and angularity of the web, it may be also used to advantage to control other equipment operating on a web such as guide rolls where substantial spacing of the detector apparatus from the web is desirable.

I claim:

1. Web position detecting apparatus for controlling the operation of a device for regulating registry of a traveling web with equipment operating thereon which causes, at least in a zone along the path of said web, substantial variation in the position of said web along an axis intersecting the plane of said web, said device having operating means for producing opposite relative position adjustment movements of said web and said equipment along a direction transverse to the direction of web movement, said apparatus comprising:

detector means for association with a web to detect opposite deviation movements thereof from a path of registry and to cause said corresponding adjustment movements by said operating means;

said detector means comprising a laser beam emitter and a receiver for said beam, said receiver provided with sensing means capable of accurately sensing changes in the amount of said beam received thereby substantially independently of changes in the ambient light;

means for mounting said emitter in a first position fixed in the direction of said axis for directing said beam at the web edge in said zone so that at predetermined positions of the web said beam is partially blocked thereby and for mounting said receiver in a second position fixed in the direction of said axis for receiving the portion of said beam unblocked by the web; said fixed positions being at opposite ends of an optical path a multiplicity of feet long to accommodate the maximum said variation in said position of said web along said axis in said zone and means for producing from said changes sensed by said sensing means said adjustment movements by said operating means.

2. Apparatus according to claim 1 wherein said mounting means connects said emitter and receiver together for mounting as a unit opposite one face of the web and said detector means includes a mirror arranged for mounting opposite the other face of the web to reflect said beam portion into said receiver.

3. Apparatus according to claim 1 wherein said receiver is a photoelectric cell.

4. Apparatus according to claim 1 wherein said equipment comprises mechanism for winding a web in roll form about an axis, said operating means of said device produces said opposite adjustment movements by moving said mechanism parallel to said roll axis and said mounting means mounts said emitter and receiver contiguous to said mechanism.

5. Apparatus according to claim 4 wherein said mounting means connects said emitter and receiver to said mechanism to move in accordance with the movements of said mechanism by said operating means.

6. Apparatus according to claim 4 wherein said mounting means connects said emitter and receiver together for mounting as a unit opposite one face of the web and said detector means includes a mirror arranged for mounting opposite the other face of the web, and spaced from the web path to reflect said beam portion into said receiver.

7. Apparatus according to claim 1 wherein said equipment comprises mechanism for unwinding a web in roll form about an axis, said operating means of said device produces said opposite adjustment movements by moving said mechanism parallel to said roll axis and said mounting means mounts said emitter and receiver contiguous to said mechanism.

8. Apparatus according to claim 7 wherein said mounting means connects said emitter and receiver together for mounting as a unit opposite one face of the web and said detector means includes a mirror arranged for mounting opposite the other face of the web, and spaced from the web path to reflect said beam portion into said receiver.

* * * * *